(12) United States Patent
Kodati (10) Patent No.: US 11,851,187 B2
(45) Date of Patent: Dec. 26, 2023

(54) SEAT LIGHT SYSTEMS AND METHODS FOR AIRCRAFT CABINS

(71) Applicant: GOODRICH CORPORATION, Charlotte, NC (US)

(72) Inventor: Sambasiva Kodati, Kaikalur (IN)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 17/736,206

(22) Filed: May 4, 2022

(65) Prior Publication Data

US 2023/0059651 A1 Feb. 23, 2023

(30) Foreign Application Priority Data

Aug. 19, 2021 (IN) .............................. 202141037641

(51) Int. Cl.
*B64D 11/06* (2006.01)
*B64D 11/00* (2006.01)

(52) U.S. Cl.
CPC ...... *B64D 11/0638* (2014.12); *B64D 11/0624* (2014.12); *B64D 2011/0053* (2013.01)

(58) Field of Classification Search
CPC ........ B64D 11/0624; B64D 2011/0053; A47C 7/725
USPC ..................................................... 297/217.6
See application file for complete search history.

(56) References Cited

U.S. PATENT DOCUMENTS

| 1,704,415 | A | * | 3/1929 | Wenegrat | A47C 7/725 297/217.6 |
| 2,514,322 | A | * | 7/1950 | Flogaus | B60Q 3/233 362/483 |
| 2,744,997 | A | * | 5/1956 | Sefsik | A47C 7/725 297/217.3 |
| 3,019,050 | A | * | 1/1962 | Spielman | B64D 11/064 297/343 |
| RE33,423 | E | * | 11/1990 | Lobanoff | B60N 2/809 297/410 |
| 5,529,265 | A | * | 6/1996 | Sakurai | B64D 11/00155 244/118.6 |
| 6,199,999 | B1 | * | 3/2001 | Cotton, Jr. | F21V 33/0012 297/445.1 |
| 6,394,551 | B1 | * | 5/2002 | Beukema | B60Q 3/233 297/391 |

(Continued)

FOREIGN PATENT DOCUMENTS

EP 3816050 5/2021
JP 2012224127 11/2012

(Continued)

OTHER PUBLICATIONS

European Patent Office, European Search Report dated Dec. 19, 2022 in Application No. 22189231.8.

*Primary Examiner* — Jose V Chen
(74) *Attorney, Agent, or Firm* — SNELL & WILMER L.L.P.

(57) ABSTRACT

A light system may comprise: a seat back housing configured to be coupled to a seat in an aircraft; a light assembly coupled to the seat back housing, the light assembly comprising: a main body at least partially disposed in the seatback housing in response to the light assembly being in a stowed state, the main body coupled to a joint and configured to move relative to the joint, and a light coupled to the main body.

16 Claims, 8 Drawing Sheets

(56) References Cited

U.S. PATENT DOCUMENTS

| | | | | |
|---|---|---|---|---|
| 6,428,096 B2* | 8/2002 | Reitze | B60Q 3/57 | |
| | | | 297/217.6 | |
| 7,909,398 B2 | 3/2011 | Ling | | |
| 8,947,869 B2* | 2/2015 | Tsai | F16M 13/02 | |
| | | | 361/679.02 | |
| 10,065,741 B1* | 9/2018 | Pozzi | B60Q 3/20 | |
| 2007/0076415 A1* | 4/2007 | Chou | B60Q 3/44 | |
| | | | 362/802 | |
| 2007/0200414 A1* | 8/2007 | Pozzi | B60N 3/004 | |
| | | | 297/217.3 | |
| 2007/0216204 A1* | 9/2007 | Schweizer | B60N 3/004 | |
| | | | 297/217.6 | |
| 2008/0136230 A1* | 6/2008 | Ling | B64D 11/0638 | |
| | | | 297/217.6 | |
| 2010/0162325 A1* | 6/2010 | Bonar | B64D 11/00151 | |
| | | | 725/76 | |
| 2011/0187163 A1* | 8/2011 | Westerink | B64D 11/0638 | |
| | | | 29/525.01 | |
| 2011/0305031 A1* | 12/2011 | Riedel | B60Q 3/43 | |
| | | | 362/513 | |
| 2012/0139303 A1* | 6/2012 | Westerink | B64D 11/0015 | |
| | | | 297/163 | |
| 2012/0139308 A1* | 6/2012 | Westerink | B64D 11/06 | |
| | | | 297/217.6 | |
| 2012/0210372 A1* | 8/2012 | Kaufmann | B64D 11/0624 | |
| | | | 725/77 | |
| 2013/0015687 A1* | 1/2013 | Kramer | B64D 11/00155 | |
| | | | 297/217.3 | |
| 2013/0093220 A1* | 4/2013 | Pajic | B64D 11/06 | |
| | | | 297/163 | |
| 2013/0162022 A1* | 6/2013 | Hollerer | B64D 11/0624 | |
| | | | 307/9.1 | |
| 2013/0341977 A1* | 12/2013 | Kiefer | B60N 2/976 | |
| | | | 297/217.3 | |
| 2014/0284973 A1* | 9/2014 | Wolgast | B64D 11/00155 | |
| | | | 297/188.04 | |
| 2015/0034687 A1* | 2/2015 | Terleski | B64D 11/0015 | |
| | | | 224/275 | |
| 2015/0036368 A1* | 2/2015 | Rittner | B60Q 3/44 | |
| | | | 362/471 | |
| 2015/0166178 A1* | 6/2015 | Savian | B64D 11/0015 | |
| | | | 244/118.6 | |
| 2016/0176337 A1* | 6/2016 | Kwak | B60Q 3/76 | |
| | | | 297/217.6 | |
| 2016/0249073 A1* | 8/2016 | Margis | B64D 11/0638 | |
| 2016/0257247 A1* | 9/2016 | Munday | B60Q 3/233 | |
| 2017/0088269 A1* | 3/2017 | Matsuda | B60N 3/004 | |
| 2019/0202565 A1* | 7/2019 | Cornell | B64D 11/0606 | |
| 2019/0283644 A1* | 9/2019 | Smith | B60N 3/004 | |
| 2020/0297119 A1* | 9/2020 | Nelson | B60Q 3/233 | |
| 2020/0324903 A1* | 10/2020 | Morales Anton | B64D 11/00152 | |
| 2021/0379223 A1* | 12/2021 | Trese | A61L 9/20 | |
| 2021/0393823 A1* | 12/2021 | Childress | B64D 13/00 | |
| 2022/0409112 A1* | 12/2022 | Borraz | G16H 20/70 | |
| 2023/0070509 A1* | 3/2023 | Imbert | B60N 2/0228 | |
| 2023/0073759 A1* | 3/2023 | Cook | G10L 17/22 | |
| 2023/0081481 A1* | 3/2023 | Soo | B64D 11/00151 | |
| 2023/0118585 A1* | 4/2023 | Lee | A61L 2/10 | |
| | | | 250/436 | |
| 2023/0145345 A1* | 5/2023 | Hurtado | B64D 11/0015 | |
| | | | 297/217.6 | |

FOREIGN PATENT DOCUMENTS

| | | | | |
|---|---|---|---|---|
| KR | | 2037330 | 10/2019 | |
| WO | | 2006041417 | 4/2006 | |
| WO | WO-2006041417 A1 * | | 4/2006 | B60N 2/879 |

* cited by examiner

SEAT LIGHT SYSTEMS AND METHODS FOR AIRCRAFT CABINS

CROSS-REFERENCE TO RELATED APPLICATIONS

This application claims priority to, and the benefit of, India Provisional Patent Application No. 202141037641, filed Aug. 19, 2021 with DAS Code 06EC and titled "SEAT LIGHT SYSTEMS AND METHODS FOR AIRCRAFT CABINS," which is incorporated by reference herein in its entirety for all purposes.

FIELD

The present disclosure relates generally to seat light systems and methods and, more particularly, to seat light systems and methods that for use in an aircraft cabin.

BACKGROUND

For passenger to read in an aircraft cabin, an overhead light is typically provided. The overhead light typically is located above and at a distance from the passenger. The overhead light may be inconvenient for co-passengers when the passenger turns on the light and/or when the passenger is using the light. Additionally, overhead reading lights have a limited range of illumination.

SUMMARY

A light system is disclosed herein. The light system may comprise: a seat back housing configured to be coupled to a seat in an aircraft; a light assembly coupled to the seat back housing, the light assembly comprising: a main body at least partially disposed in the seatback housing in response to the light assembly being in a stowed state, the main body coupled to a joint and configured to move relative to the joint, and a light coupled to the main body.

The light system may further comprise a tray and a latch, the tray configured to open in response to actuating the latch, the light configured to emit electromagnetic radiation toward the tray in response to the light being in an operable state and the tray being open. The light assembly may further comprise an intensity adjuster configured to adjust an intensity of the electromagnetic radiation of the light. The joint may comprise a ball and socket joint. The light assembly may be configured to transition from the stowed state to an operable state in response to pressing a portion of an outer surface of the main body. A housing of the light assembly and the seat back housing may be a monolithic component. A housing of the light assembly and the seat back housing may be distinct components. The housing may comprise an outer surface and a recess disposed in the outer surface, the main body configured to be at least partially disposed in the recess in response to being in the stowed state.

A seat back assembly is disclosed herein. The seat back assembly may comprise: a tray configured to transition from a first stowed state to an open state; a light assembly, comprising: a housing, a main body coupled to the housing via a joint, the main body configured to move relative to the housing via the joint, the main body configured to transition the light assembly from a second stowed state to an operable state, and a light coupled to the main body at an end distal to the joint, the light configured to emit electromagnetic radiation towards the tray with the tray being in the open state and the light assembly being in the operable state.

The light assembly may comprise an intensity adjuster configured to adjust an intensity of the electromagnetic radiation. The seat back assembly may further comprise a power source, the light electrically coupled to the power source. The seat back assembly may further comprise a monitor, the monitor electrically coupled to the power source. The joint may comprise a ball and socket joint. The housing may comprise an outer surface and a recess disposed in the outer surface, the main body configured to be at least partially disposed in the recess in response to being in the stowed state.

An aircraft is disclosed herein. The aircraft may comprise: a plurality of seats, each seat comprising: a tray configured to transition from a first stowed state to an open state, and a light assembly configured to direct an electromagnetic radiation toward the tray with the tray being in the open state and the light assembly being in an operable state.

In various embodiments, the light assembly comprises a main body coupled to a housing of a respective seat in the plurality of seats via a joint. The light assembly may be configured to transition from a second stowed state to an operable state in response to pressing an area of the main body. The joint may comprise a ball and socket joint. The aircraft may further comprise a power source for each row of seats in the plurality of seats, and wherein each seat in each row of seats includes the light assembly electrically coupled to the power source for the row of seats. The aircraft may further comprise a plurality of disconnect brackets, each disconnect bracket disposed between the light assembly and the power source.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein are seat light systems and methods for use in an aircraft cabin. In various embodiments, the seat light systems include a light assembly configured to couple to a seat back assembly. The light assembly may include a housing, a main body and a light. The main body may be configured to be housed in the housing in a stowed state and a portion of the main body may be disposed out of the housing in an open, or operable state. The light may be disposed in the body and oriented towards a seat back tray when the seat back tray is in an open state. In various embodiments, the light assembly may be configured for an occupant to adjust direction of the light and/or adjust an intensity of the light as described further herein.

In various embodiments, the light assembly disclosed herein may be configured to be retrofitted into current designs. In this regard, the light assembly may be a low cost solution that provides a more enjoyable experience for passengers by allowing adjustment of intensity of the light and/or preventing unenjoyable interactions with co-passengers, in accordance with various embodiments.

Figure 1:
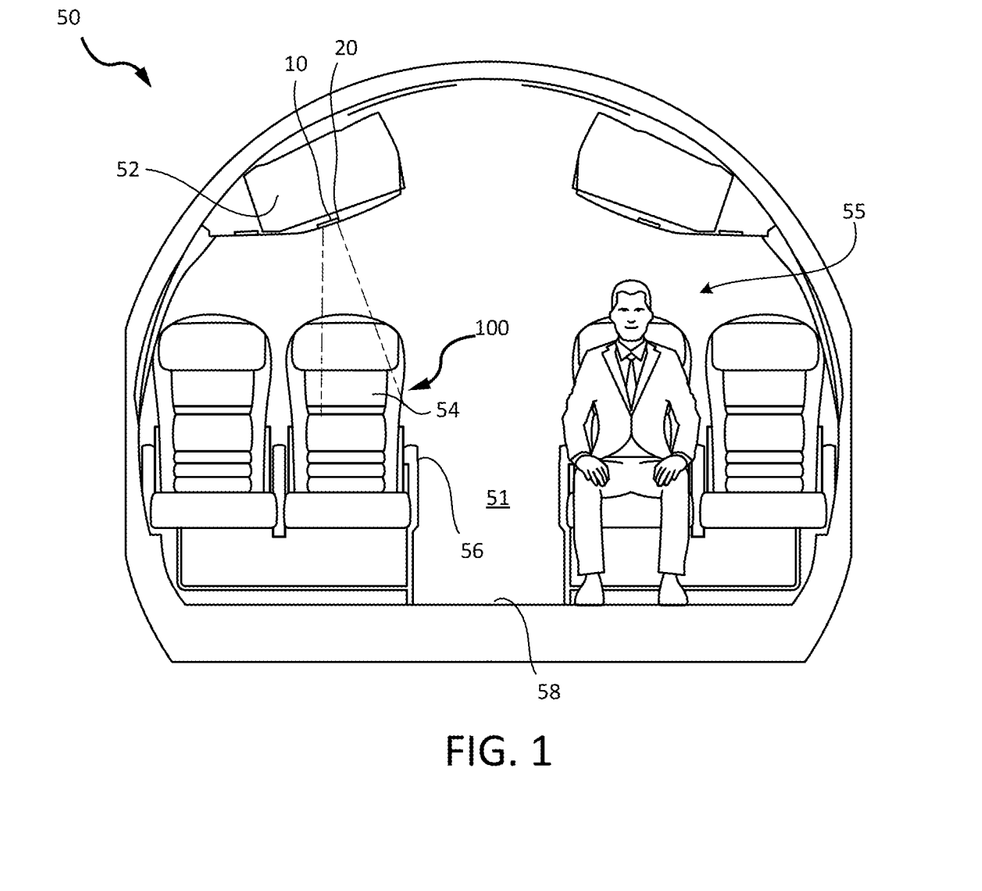
FIG. 1 illustrates an aircraft cabin having a seat light system, in accordance with various embodiments.

With reference to FIG. 1, a cabin 51 of an aircraft 50 is shown, according to various embodiments. The aircraft 50 may be any aircraft such as an airplane, a helicopter, or any other aircraft. The aircraft 50 may include passenger service units (PSUs) 10 that control various functions for passengers 55 in the cabin 51. Pathogens, such as viruses and bacteria, may remain on surfaces of the cabin 51, and these remaining pathogens may result in indirect contact transmission to other people (e.g., subsequent passengers). For example, the cabin 51 may include overhead bins 52, passenger seats 54 for supporting passengers 55, armrest 56, lavatory surfaces, PEDs, and other structures/surfaces.

Figure 2:
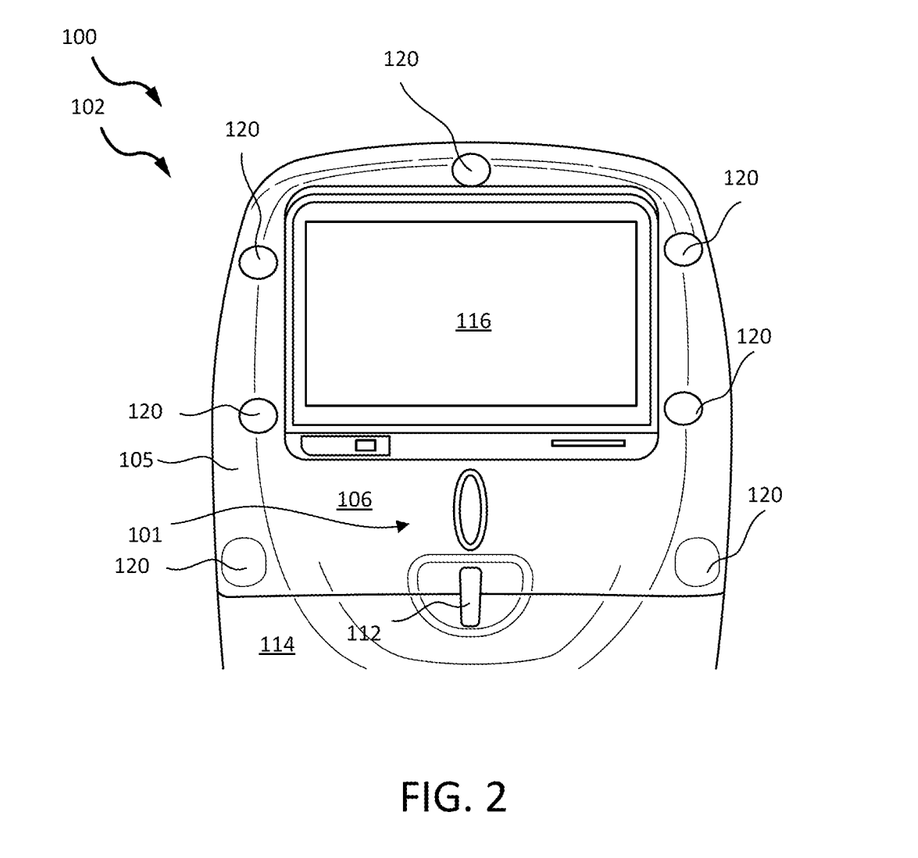
FIG. 2 illustrates a seat assembly in an aircraft cabin, in accordance with various embodiments.

Referring now to FIG. 2, a seat light system 100 for use in a cabin 51 of the aircraft 50 from FIG. 1 is illustrated, in accordance with various embodiments. In various embodiments, the seat light system 100 is disposed in a seat assembly 102. The seat light system 100 comprises a light assembly 101. The light assembly 101 may be operably coupled to a seat back 105. In various embodiments, the seat back 105 may include a housing, a portion of a seat 54 from FIG. 1, or the like. The present disclosure is not limited in this regard. In various embodiments, the light assembly 101 is disposed proximate a latch 112. "Proximate" as disclosed herein refers to being spaced apart from, in accordance with various embodiments. The latch 112 may be configured to release a tray 114, in accordance with various embodiments. In this regard, latch 112 may retrain the tray 114 in a closed state in response to the latch 112 being in a first position as illustrated. In various embodiments, by rotating the latch 112, the tray 114 may be released and transition into an open state. Although illustrated as being configured to rotate, the latch 112 is not limited in this regard. For example, the latch 112 could comprise a push release, an automated release, or the like.

In various embodiments, the seat assembly 102 comprises a monitor 116. The monitor 116 may be configured to display various media, such as movies, games, etc. In various embodiments, the monitor 116 is electrically coupled to a power source. In this regard, the light assembly 101 may be retrofitted into an existing seat assembly by electrically coupling the light assembly 101 to the power source configured to power monitor 116 as described further herein. Although illustrated as including the monitor 116, the present disclosure is not limited in this regard. For example, a seat assembly 102 without a monitor 116 is within the scope of this disclosure.

Figure 5:
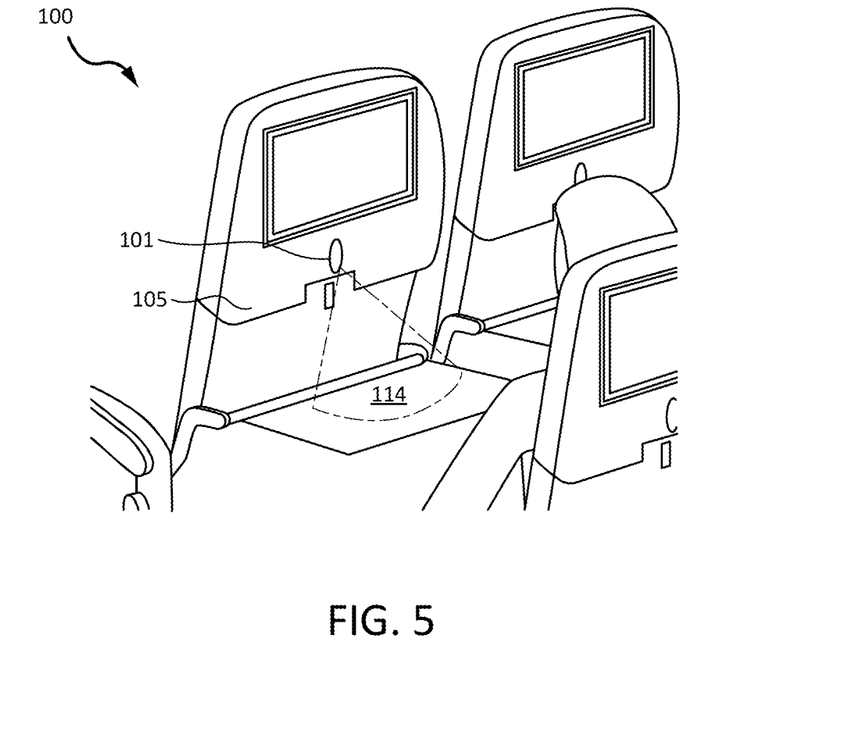
FIG. 5 illustrates a perspective view of a seat light system in use, in accordance with various embodiments.

In various embodiments, the light assembly 101 is coupled to the seat back 105. In various embodiments, the seat back 105 includes a housing 106. The housing 106 may house the light assembly 101 in accordance with various embodiments. In various embodiments, a housing of the light assembly 101 is a distinct component from the housing 106 of the seat back 105. In various embodiments, the housing of the light assembly 101 may be integral with the housing 106 (i.e., the housing of the light assembly 101 and the housing 106 of the seat back 105 may be a monolithic component or formed from a single-piece of material, as shown in FIG. 5). The present disclosure is not limited in this regard.

Although illustrated as having the light assembly 101 disposed vertically between the latch 112 and the monitor 116, the present disclosure is not limited in this regard. For example, the light assembly 101 may be disposed in any of a plurality of locations 120 disposed on the seat back 105, in accordance with various embodiments. In various embodiments, the light assembly 101 may be disposed in multiple locations on the seat back 105.

Figure 3A:
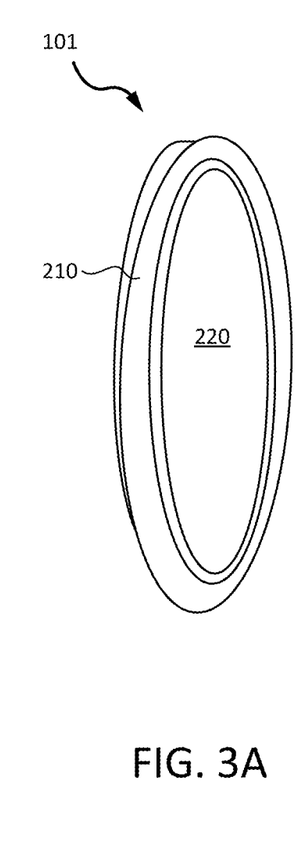
FIG. 3A illustrates a light assembly in a stowed state, in accordance with various embodiments.
Figure 3B:
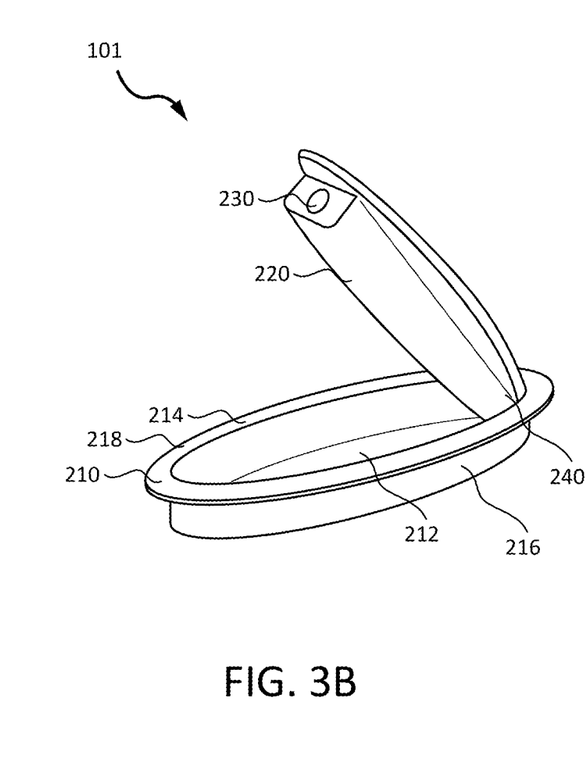
FIG. 3B illustrates a light assembly in an open, or operable, state, in accordance with various embodiments.

Referring now to FIGS. 3A and 3B, the light assembly 101 from light system 100 of FIG. 2 is illustrated in a stowed state (FIG. 3A) and an operable state (FIG. 3B), in accordance with various embodiments. A "stowed state" as defined herein refers to a position where a light 230 of the light assembly 101 is blocked by a housing 210. An "operable state" as defined herein refers to a position where the light 230 of the light assembly 101 is at least partially exposed (i.e., configured to illuminate at least a portion of a surface).

The light assembly 101 comprises the housing 210 and a main body 220, and a light 230. The light 230 is coupled to the main body 220 and configured to illuminate a surface during use. The light 230 may comprise a light emitting diode ("LED"), an incandescent lamp, a fluorescent light, a halogen lamp, a fluorescent tube, a neon lamp, or the like. The present disclosure is not limited in this regard.

In various embodiments, the housing 210 comprises a recess 212 disposed in an outer surface 214. Although illustrated as comprising a recess 212 defining a bottom surface, the present disclosure is not limited in this regard. For example, the housing 210 could define a slot through the outer surface 214, in accordance with various embodiments. In various embodiments, the recess 212 may be at least partially defined by a wall 216. In various embodiments, the wall 216 may be coupled to, or integral with, a flange 218 disposed at a top portion (i.e., distal to a bottom surface of the recess 212) extending outward from the wall 216. In various embodiments, the wall 216 and the flange 218 may define a shoulder. In this regard, the wall 216 and flange 218 may be configured to be press fit into a housing 106 of a seat back 105 from FIG. 1, in accordance with various embodiments. However, the present disclosure isn't limited in this regard, and any coupling means may be utilized to couple the housing 210 to the housing 106 of the seat back 105 from FIG. 2, such as via fasteners, adhesives, or the like.

In various embodiments, the recess 212 may define a first shape. In various embodiments, the first shape may be complimentary to at least a portion of the main body 220. In this regard, the recess 212 may be configured to stow at least a portion of the main body 220 when the light assembly 101 is in the stowed state. In various embodiments, the main body 220 is coupled to the housing 210 via a joint 240. In various embodiments, the joint 240 may comprise a ball and socket joint, a hinge joint, a pivot joint, a saddle joint or the like. In various embodiments, the joint 240 is a ball and socket joint. In this regard, the joint may facilitate movement in various directions about a center point of the ball in the ball and socket joint.

Figure 4:
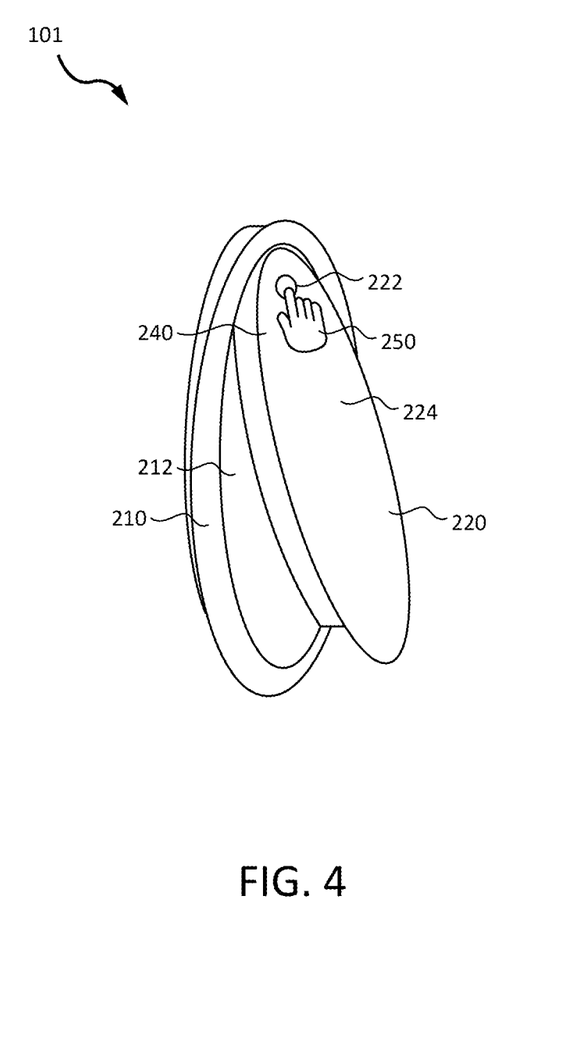
FIG. 4 illustrates a perspective view of a light assembly in an open state.

Referring now to FIG. 4, the light assembly 101 during a transition from the stowed state to a fully opened state is illustrated, in accordance with various embodiments. A "fully opened state" as disclosed herein refers to the light 230 from FIG. 3B being completely unobstructed by the housing 210. In various embodiments, a user 250 may press on an area 222 of an outer surface 224 to transition the light assembly 101 from the stowed state (FIG. 3A) to the fully opened state (FIG. 3B). In this regard, by pressing the area 222, the main body 220 may pivot about the joint 240, causing at least a portion of the main body 220 to extend outward of recess 212 of the housing 210. Although illustrated as being manually operated, the present disclosure is not limited in this regard. For example, the light assembly 101 may be configured to transition from the stowed state to the fully opened state automatically, or vice versa. In various embodiments, a position of the light assembly 101 may be configurable through a user interface (e.g., on monitor 216 from FIG. 2), or the like.

Referring now to FIG. 5, the light assembly 101 during operation is illustrated, in accordance with various embodiments. In various embodiments, in the operable state, the light assembly 101 is configured to emit electromagnetic radiation output towards a surface (e.g., a tray 114 coupled to the seat back 105). In various embodiments, the light assembly 101 is adaptable to direct light 502 in various directions to provide more user-friendly lighting option in a cabin 50 of an aircraft 51 from FIG. 1.

Figure 6:
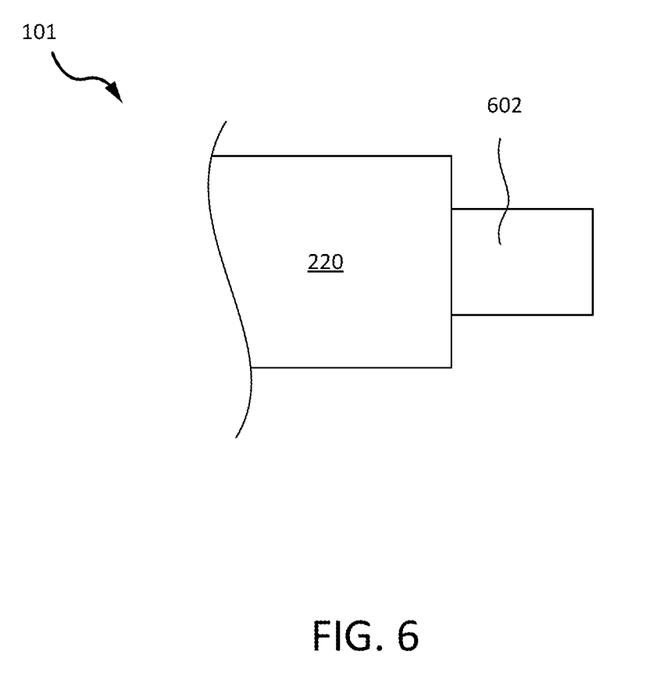
FIG. 6 illustrates a portion of a light assembly, in accordance with various embodiments.

Referring now to FIG. 6, a side view of a portion of the light assembly 101 is illustrated in accordance with various embodiments. The light assembly 101 may further comprise an intensity adjuster 602, in accordance with various embodiments. The intensity adjuster 602 may be configured to adjust an intensity of the light 230 from FIG. 3B. In various embodiments, the intensity adjuster 602 may be configured to rotate about a central axis defined by the intensity adjuster 602 (e.g., by being rotatably interconnected with the main body 220). In this regard, an intensity of the light 230 may vary proportionally to an angle of rotation relative to the central axis, in accordance with various embodiments. Although described with respect to a rotatable intensity adjuster 602, the present disclosure isn't limited in this regard. For example, a sliding adjuster or the like is within the scope of this disclosure. In various embodiments, the light 230 from FIG. 3B is housed within the intensity adjuster 602.

Figure 7:
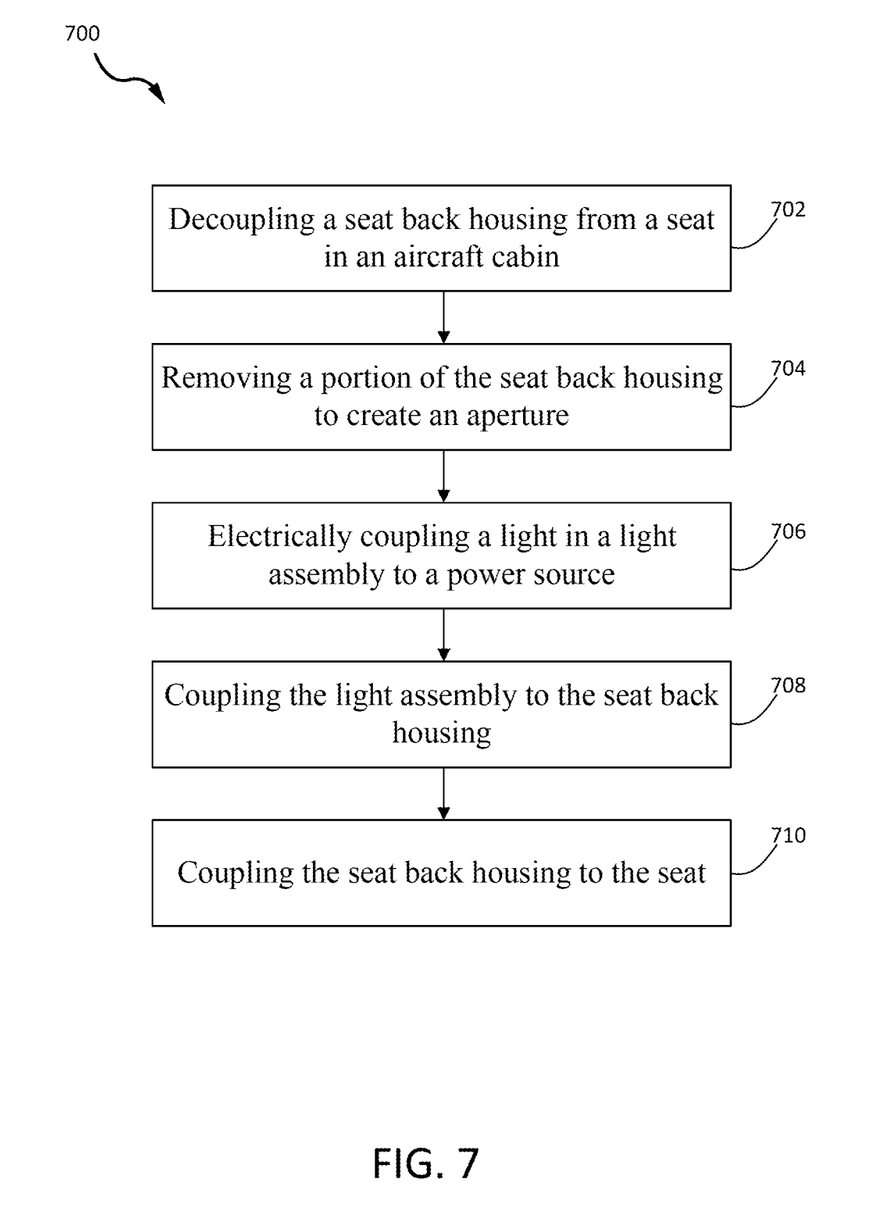
FIG. 7 illustrates a retrofit process for a light system, in accordance with various embodiments.

Referring now to FIG. 7, a process 700 for retrofitting a light assembly into a seat back of a seat on an aircraft is illustrated, in accordance with various embodiments. The process 700 comprises decoupling a seat back housing from a seat (e.g., passenger seat 54) in a cabin 50 of an aircraft 51 from FIG. 1 (step 702). The seat back housing of step 702 does not include a light assembly therein. In various embodiments, decoupling the seat back housing 105 may include removing fasteners or the like.

In various embodiments, the process 702 further comprises removing a portion of the seat back housing to create an aperture (step 704). Although illustrated as including step 704, a pre-manufactured seat back housing may be utilized instead of step 704, in accordance with various embodiments. The aperture 704 may be configured to receive a housing 210 of a light assembly 101 therein.

In various embodiments, the process 700 further comprises electrically coupling a light 230 in the light assembly 101 to a power source. In various embodiments, the power source is in electrical communication with a monitor 216 of the seat back assembly 102 from FIG. 2. In various embodiments, electrically coupling the light 230 to the power source may include splicing an electrical wire and coupling the spliced electrical wire to a terminal of the light 230.

In various embodiments, the process 700 further comprises coupling the light assembly 101 to the seat back housing (step 708). The light assembly 101 may be coupled via fasteners, press fit, adhesives, or the like.

In various embodiments, the process 700 further comprises coupling the seat back housing to the seat (step 710). In various embodiments, the resultant seat assembly may be in accordance with seat assembly 102 from FIG. 2, in accordance with various embodiments. The process 700 may be repeated for a respective row of seats in an aircraft, where the power source is the same for each seat in a respective row, in accordance with various embodiments.

Figure 8:
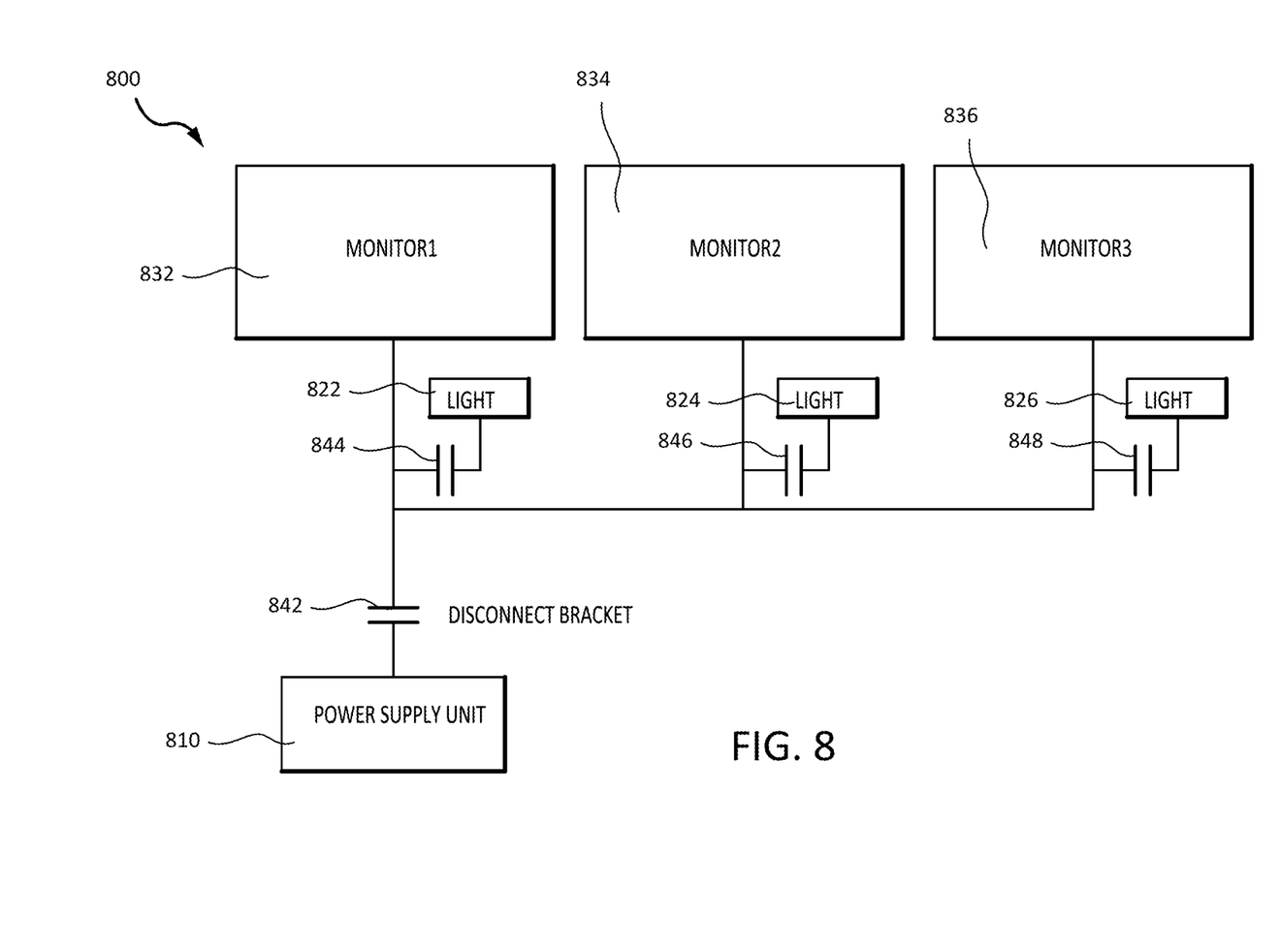
FIG. 8 illustrates a schematic view of a light system, in accordance with various embodiments.

Referring now to FIG. 8, a schematic view of an electrical system 800 for a row of seats in an aircraft cabin (e.g., cabin 50 from FIG. 1) is illustrated, in accordance with various embodiments. In various embodiments, the electrical system 800 comprises a power supply unit 810, a plurality of lights (lights 822, 824, 826), a plurality of monitors (monitors 832, 834, 836), and a plurality of disconnect brackets (disconnect brackets 842, 844, 846, 848). The disconnect brackets may be configured to disconnect electricity from a light to the power supply unit (e.g., disconnect bracket 844 may disconnect electricity from the light 822 to the power supply unit 810). In various embodiments, a disconnect bracket 842 may be configured to disconnect all electrical components from the power supply unit 810, in accordance with various embodiments. In this regard the disconnect brackets 842, 844, 846, 848 may facilitate maintenance of a respective electrical component, or all electrical components, in accordance with various embodiments.

In various embodiments, the process 700 may result in electrical system 800. For example, in response to step 706, a respective disconnect bracket may be installed (e.g., disconnect bracket 844), resulting in a light 230 of a light assembly 101 being electrically coupled to the power supply unit 810, in accordance with various embodiments.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A light system, comprising:
   a seat back housing configured to be coupled to a seat in an aircraft;
   a light assembly directly connected to the seat back housing, the light assembly comprising:
   a housing directly connected to the seat back housing, the housing comprising a recess disposed in an outer surface and a flange, the recess defined by a bottom surface and a wall, the flange extending outward from the wall
   a main body at least partially disposed the recess of the housing in response to the light assembly being in a stowed state, the main body coupled to a joint and configured to move relative to the joint, and
   a light coupled to the main body.

2. The light system of claim 1, further comprising a tray and a latch, the tray configured to open in response to actuating the latch, the light configured to emit electromagnetic radiation toward the tray in response to the light being in an operable state and the tray being open.

3. The light system of claim 2, wherein the light assembly further comprises an intensity adjuster configured to adjust an intensity of the electromagnetic radiation of the light.

4. The light system of claim 1, wherein the joint comprises a ball and socket joint.

5. The light system of claim 1, wherein the light assembly is configured to transition from the stowed state to an operable state in response to pressing a portion of an outer surface of the main body.

6. The light system of claim 1, wherein the housing of the light assembly and the seat back housing are distinct components.

7. A seat back assembly, comprising:
   a seat back housing;
   a tray coupled to the seat back housing configured to transition from a first stowed state to an open state;
   a light assembly, comprising:
   a housing directly connected to the seat back housing, the housing comprising a recess disposed in an outer surface and a flange, the recess defined by a bottom surface and a wall, the flange extending outward from the wall,
   a main body disposed in the recess of the housing, the main body coupled to the housing via a joint, the main body configured to move relative to the housing via the joint, the main body configured to transition the light assembly from a second stowed state to an operable state, and
   a light coupled to the main body at an end distal to the joint, the light configured to emit electromagnetic radiation towards the tray with the tray being in the open state and the light assembly being in the operable state.

8. The seat back assembly of claim 7, wherein the light assembly comprises an intensity adjuster configured to adjust an intensity of the electromagnetic radiation.

9. The seat back assembly of claim 8, further comprising a power source, the light electrically coupled to the power source.

10. The seat back assembly of claim 9, further comprising a monitor, the monitor electrically coupled to the power source, wherein the light assembly is disposed vertically between a latch and the monitor.

11. The seat back assembly of claim 7, wherein the joint comprises a ball and socket joint.

12. An aircraft, comprising,
a plurality of seats, each seat comprising:
- a seat back housing;
- a tray configured to transition from a first stowed state to an open state, and
- a light assembly directly connected to the seat back housing configured to direct an electromagnetic radiation toward the tray with the tray being in the open state and the light assembly being in an operable state, the light assembly comprising:
  - a housing directly connected to the seat back housing, the housing comprising a recess disposed in an outer surface and a flange, the recess defined by a bottom surface and a wall, the flange extending outward from the wall,
  - a main body coupled to the housing via a joint and configured to be stowed in the recess in a stowed state; and
  - a light coupled to the main body.

13. The aircraft of claim 12, wherein the light assembly is configured to transition from a second stowed state to the operable state in response to pressing an area of the main body.

14. The aircraft of claim 12, wherein the joint comprises a ball and socket joint.

15. The aircraft of claim 12, further comprising a plurality of disconnect brackets, each disconnect bracket disposed between the light assembly and a power source.

16. The aircraft of claim 12, further comprising a power source for each row of seats in the plurality of seats, and wherein each seat in each row of seats includes the light assembly electrically coupled to the power source for the row of seats.

* * * * *

UNITED STATES PATENT AND TRADEMARK OFFICE
CERTIFICATE OF CORRECTION

| | |
|---|---|
| PATENT NO. | : 11,851,187 B2 |
| APPLICATION NO. | : 17/736206 |
| DATED | : December 26, 2023 |
| INVENTOR(S) | : Sambasiva Kodati |

It is certified that error appears in the above-identified patent and that said Letters Patent is hereby corrected as shown below:

On the Title Page

Item (73) Assignee, Please change "Goodrich Corporation" to --Goodrich Lighting Systems, Inc.--.

Signed and Sealed this
Eighth Day of October, 2024

Katherine Kelly Vidal
*Director of the United States Patent and Trademark Office*